United States Patent
Magee et al.

(10) Patent No.: US 7,184,499 B2
(45) Date of Patent: Feb. 27, 2007

(54) METHOD OF TIMING COMPENSATION FOR OFDM-BASED WIRELESS COMMUNICATION SYSTEM CODED PARAMETER SIGNALING (CPS) DECODE OPERATIONS

(75) Inventors: David P. Magee, Plano, TX (US); Srinath Hosur, Plano, TX (US); Manish Goel, Dallas, TX (US)

(73) Assignee: Texas Instruments Incorporated, Dallas, TX (US)

( * ) Notice: Subject to any disclaimer, the term of this patent is extended or adjusted under 35 U.S.C. 154(b) by 718 days.

(21) Appl. No.: 10/438,242

(22) Filed: May 14, 2003

(65) Prior Publication Data

US 2003/0220104 A1 Nov. 27, 2003

Related U.S. Application Data

(60) Provisional application No. 60/378,114, filed on May 14, 2002, provisional application No. 60/380,609, filed on May 14, 2002.

(51) Int. Cl.
*H03D 1/04* (2006.01)

(52) U.S. Cl. .................................................. 375/346
(58) Field of Classification Search ............... 375/346, 375/316, 285, 130; 370/208, 210, 516, 365
See application file for complete search history.

(56) References Cited

U.S. PATENT DOCUMENTS

| | | | | |
|---|---|---|---|---|
| 5,812,523 | A * | 9/1998 | Isaksson et al. | 370/208 |
| 6,480,555 | B1 * | 11/2002 | Renard et al. | 375/340 |
| 6,671,340 | B1 * | 12/2003 | Kroeger et al. | 375/350 |

* cited by examiner

*Primary Examiner*—Khai Tran
(74) *Attorney, Agent, or Firm*—Steven A. Shaw; W. James Brady; Frederick J. Telecky, Jr.

(57) ABSTRACT

A method of determining CPS data in an OFDM-based, wireless communication system resolves the phase angle difference between training tones in a burst without CPS data and training tones in a burst with CPS data and then demodulates the resulting difference phase angles to determine the CPS data. The method achieves timing correction/compensation in CPS decode operations associated with OFDM-based, wireless communication systems.

10 Claims, 1 Drawing Sheet

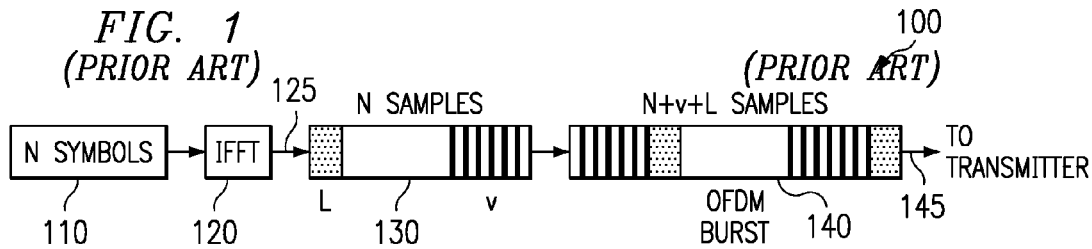
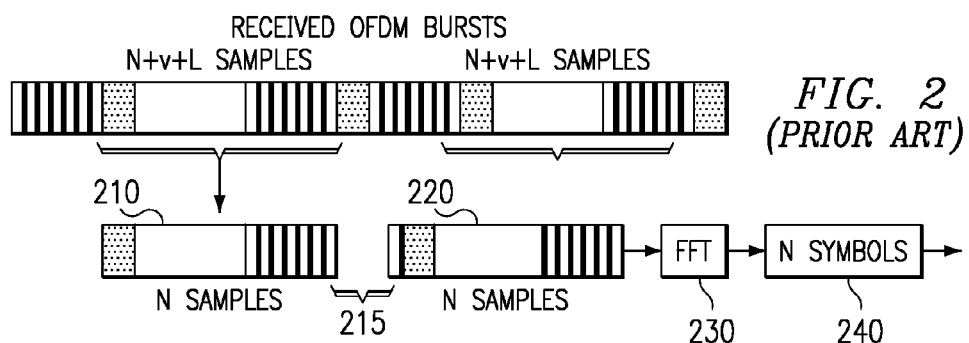
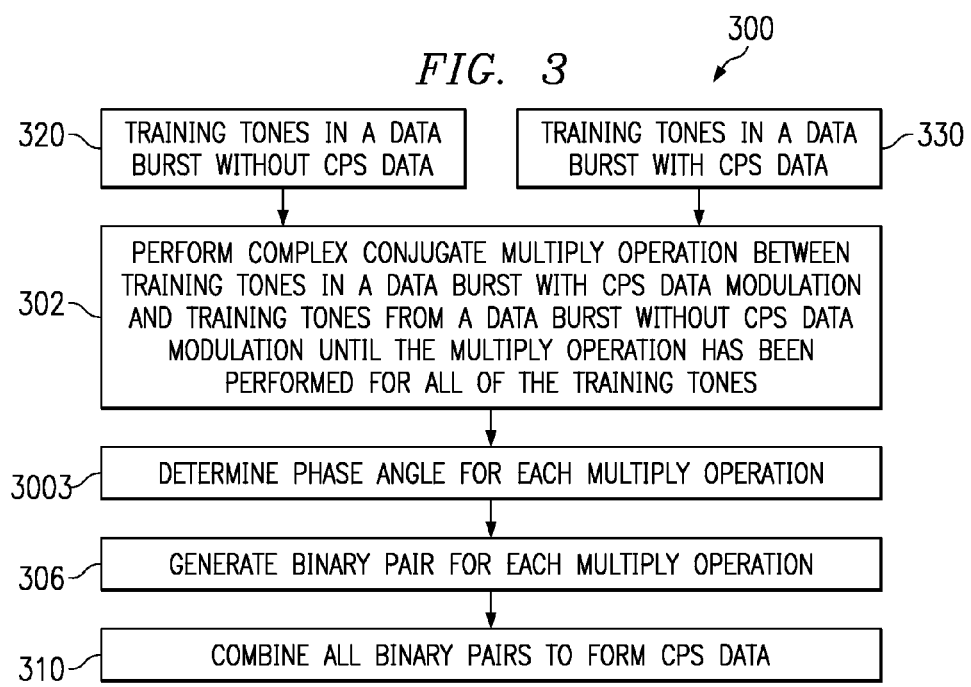

METHOD OF TIMING COMPENSATION FOR OFDM-BASED WIRELESS COMMUNICATION SYSTEM CODED PARAMETER SIGNALING (CPS) DECODE OPERATIONS

CROSS REFERENCE TO RELATED APPLICATIONS

This application claims the benefit, under 35 U.S.C. §119(e)(1) of U.S. Provisional Application Nos. 60/378,114 and 60/380,609, both filed May 14, 2002, and both incorporated herein by this reference. This application is related to co-pending and commonly assigned patent application Ser. No. 10/438,243.

BACKGROUND OF THE INVENTION

1. Field of the Invention

This invention relates generally to wireless communication systems, and more particularly, to a method of implementing timing corrections in coded parameter signaling (CPS) decode operations found in OFDM based, wireless communication systems.

2. Description of the Prior Art

Coding parameters associated with most wireless communication systems are generally modulated into a transmitted signal that assists with configuration of Customer Premise Equipment (CPE). The CPE modem has to perform integer frequency offset estimation and correction to receive data transmitted by the headend (HE). Orthogonal Frequency Division Modulation (OFDM) is a technique for providing fixed broadband wireless access (BWA) at high data rates to homes and small offices. The HE, using this technique, broadcasts a burst of data using OFDM. As shown in FIG. 1, an OFDM burst is constructed as follows: data symbols, zeros, and pilot/training symbols (total N symbols 110) are assembled in the frequency domain and the inverse FFT (IFFT) signal 125 is output from the IFFT 120 to form the time domain representation of the symbols at 130. A cyclic prefix and postfix are usually added to the resulting time domain samples as shown at block 140. The cyclic prefix is simply the last v samples of the IFFT signal and the cyclic postfix is simply the first L samples of the IFFT signal. The cyclic prefix is appended to the beginning of the N time domain samples and the cyclic postfix is appended to the end of the N time domain samples, resulting in an OFDM burst size of N+v+L samples at 145. The OFDM burst can then be upsampled, filtered, upconverted and transmitted.

The OFDM receiver can have one or two antenna. The following discussion assumes a single receive antenna. Extension to a dual antenna system involves combining the antenna outputs appropriately and the following discussion can be easily extended to a dual antenna system.

In order to receive the signal from the HE, the CPE modem first has to synchronize to the HE. This implies that the modem has to perform the following initial steps a) check to determine if it is receiving enough signal strength, b) acquire and track the OFDM burst boundaries for proper FFT operation, c) estimate and correct the is frequency offset between its local oscillator and that of the HE, d) decode the CPS parameters transmitted on the training tones and e) perform channel estimation, data demodulation, decoding (Forward Error Correction) and MAC synchronization.

The CPE modem correlates L samples of the received signal after demodulation and analog to digital conversion with L corresponding samples spaced apart by N samples in order to acquire and track the OFDM burst boundaries. The average energy of the 2L samples is then subtracted from the correlation to yield the burst timing metric. In the case of two antennas, the burst timing metric is computed for each of the antennas individually and then combined using any of the standard combining techniques such as equal gain, maximal ratio, etc. Due to the use of a cyclic post-fix, the resulting burst timing cost function (BTCF) has a minimum at the valid start of an OFDM burst boundary. A burst boundary/time tracking algorithm tracks the minimum of the BTCF and configures the hardware and the FFT to start at a valid minimum. Thus, during tracking, the N samples 210 and 220 for the FFT 230 out of the N+v+L sample size burst can be grabbed a few samples earlier or later as compared to the previous burst. This results in what is called a slip such as seen in FIG. 2 at 215.

A slip results in a linear phase difference across the tones (after the FFT 230) between the current and the previous burst. This linear phase is normally taken care of by the channel estimation obtained using the pilot tones. This phase difference should however, be compensated for correct frequency offset estimation which occurs before the channel estimation and CPS decoding steps.

In OFDM-based communication systems, the training tones (i.e. pilot tones) are modulated with Coding Parameter Signaling (CPS) data that denote the transmission parameters such as constellation size for data modulation, coding rate for the Reed-Solomon decoder and depth for the interleaver. One technique known to those skilled in the art of wireless communication systems and that has been proposed as a Broadband Wireless Internet Forum (BWIF) standard for broadband wireless air interface technology is problematic since it did not consider any timing correction, or slip correction, that might be required when evaluating two consecutive data bursts. Such a timing correction is necessary if and when one data burst slips relative to a previous data burst as a result of variations in a wireless communication channel and/or drift in the CPE clock relative to the HE clock. The present inventors have discovered that CPS decoding techniques most often fail to recover the foregoing CPS data in the absence of slip correction. In view of the above, there is a need in the wireless communication art for a method for achieving timing correction/compensation in CPS decode operations associated with OFDM-based, wireless communication systems.

SUMMARY OF THE INVENTION

The present invention is directed to a method for achieving timing correction/compensation in CPS decode operations associated with OFDM-based, wireless communication systems. CPS data in an OFDM-based, wireless communication system is modulated as QPSK data on the training tones of the data burst. In the BWIF standard, discussed herein above, the CPS data is, modulated on every third burst. As long as some bursts have the CPS data modulation and some bursts do not have the CPS data-modulation, the CPS data can be recovered.

In one aspect of the invention, a method of determining CPS data in an OFDM-based, wireless communication system resolves the phase angle difference between training tones in a burst without CPS data and training tones in a burst with CPS data and then demodulates the resulting difference phase angles to determine the CPS data.

In yet another aspect of the invention, a method is provided to improve CPS decode performance in a wireless communication system by multiplying $P[k_T]$ by $$e^{-j\frac{2\pi}{N}k_T s},$$

where P is a data structure of phasors indexed by $k_T$. This operation nullifies the effect of slip and results in correct CPS demodulation.

In still another aspect of the invention, a method of implementing timing compensation into the CPS decode process is provided to determine CPS data in an OFDM-based, wireless communication system.

According to still another aspect of the invention, a method of compensating for the effect of slip in an OFDM-based wireless communication system is implemented by averaging slip values to minimize the occurrence, and detection, of false slips being propagated through the signal processing algorithms of the OFDM-based wireless communication system. The slip computation that results from averaging slip values can be written as $$s[b] = \begin{cases} +1 & (MinIndex > DesiredIndex + SlipTotal[b-1]) \\ 0 & (MinIndex = DesiredIndex + SlipTotal[b-1]) \\ -1 & (MinIndex < DesiredIndex + SlipTotal[b-1]) \end{cases}$$

$$\text{where } SlipTotal[b] = \sum_{k=0}^{SlipDelay-1} s[b-k].$$

The SlipDelay variable refers to the timing delay between the time when the timing adjustment is made to the data stream and the time when the slip identification algorithm detects the adjustment. By computing the slip value in this manner, unnecessary timing adjustments can be avoided and the signal-to-noise ratio (SNR) of the signal processing algorithms can be maintained in the wireless communication system.

BRIEF DESCRIPTION OF THE DRAWINGS

Other aspects, features and attendant advantages of the present invention will be readily appreciated as the invention becomes better understood by reference to the following detailed description when considered in connection with the accompanying drawings wherein:

FIG. 1 illustrates the construction of an OFDM burst;

FIG. 2 illustrates a slip in OFDM burst reception; and

FIG. 3 is a flowchart depicting a method for achieving timing correction/compensation in CPS decode operations associated with OFDM-based, wireless communication systems according to one embodiment of the present invention.

While the above-identified drawing figures set forth particular embodiments, other embodiments of the present invention are also contemplated, as noted in the discussion. In all cases, this-disclosure presents illustrated embodiments of the present invention by way of representation and not limitation. Numerous other modifications and embodiments can be devised by those skilled in the art which fall within the scope and spirit of the principles of this invention.

DETAILED DESCRIPTION OF THE PREFERRED EMBODIMENTS

The preferred embodiments discussed herein below are best understood by first reiterating relevant portions of the background set forth herein before to establish a context for the present invention. As with most wireless communication systems, coding parameters are often modulated onto a transmitted signal that assists with configuration of the Customer Premise Equipment (CPE). In OFDM-based systems, the training tones (i.e. pilot tones) are modulated with Coding Parameter Signaling (CPS) data that denote transmission parameters such as constellation size for data modulation, coding rate for the Reed-Solomon decoder and depth for the interleaver. One technique associated with a proposed BWIF standard for retrieving this CPS data does not employ any timing correction (slip correction) that might be required when evaluating two consecutive data bursts. The present inventors have found that a timing correction is necessary when one data burst slips relative to a previous data burst as a result of variations associated with the wireless communication channel and/or drift in the CPS clock relative to the HE clock. The present inventors have determined that the foregoing CPS decoding fails most of the time in the absence of such slip correction. In view of the foregoing, a preferred embodiment of the present invention is now set forth below that describes a method for achieving timing correction/compensation in CPS decode operations associated with OFDM-based, wireless communication systems.

The CPS data in an OFDM-based, wireless communication system is modulated as QPSK data on the training tones of the data burst. In the BWIF standard discussed herein above, the CPS data is modulated on every third burst. As long as some bursts have the CPS data modulation and some bursts do not have the CPS data modulation, the CPS data can be recovered. According to the preferred embodiment 300 depicted in FIG. 3, the CPS data is determined by first determining the phase angle difference between training tones in a burst without CPS data 330 and training tones in a burst with CPS data 320 as shown in block 302. By demodulating these difference phase angles, the CPS data can be determined. The difference phase angles are first determined by computing a complex conjugate multiply between training tones from a data burst with CPS data 320 modulation and training tones from a data burst without CPS data 330 modulation as shown in block 302. This correlation operation can be written as $$P[k_T]=Y[k_T,b_2]\cdot Y^*[k_T,b_1] \text{ for } k_T \in \{\text{Training Tone Indices}\} \quad (1)$$

where $Y[k_T,b_2]$ denotes the frequency response of training tone $k_T$ in data burst $b_2$ and $Y^*[k_T,b_1]$ denotes the complex conjugate of the frequency response of training tone $k_T$ in data burst $b_1$. Once this multiplication has been performed for all of the training tones, the phase angle for each $P[k_T]$ can be computed at block 306 to yield a binary pair as shown in block 308. The CPS data is then formed by combining all the binary pairs as shown in block 310.

If data burst $b_2$ experiences a positive slip with respect to the data burst $b_1$, the frequency response for data burst $b_1$ must be compensated by the expression $$\hat{Y}[k, b_1]=e^{j\phi_k}\cdot Y[k, b_1] \text{ for } 0\leq k \leq N-1 \quad (2)$$

where $Y[k,b_1]$ denotes the frequency response of tone k in data burst $b_1$, $\hat{Y}[k,b_1]$ denotes the phase corrected frequency response of tone k in data burst $b_1$, N is the number of tones in a data burst and $\phi_k$ is a sequence of known phase rotations.

Similarly, if data burst $b_2$ experiences a negative slip with respect to data burst $b_1$, the frequency response for data burst $b_1$ must be compensated by the expression $$\hat{Y}[k, b_1]=e^{-j\phi_k}\cdot Y[k, b_1] \text{ for } 0\leq k \leq N-1 \quad (3)$$

In general, the equation to compensate the frequency response for data burst $b_1$ can be written as $$\hat{Y}[k, b_1]=e^{j\phi_k \cdot s}\cdot Y[k, b_1] \text{ for } 0\leq k \leq N-1 \quad (4)$$

where the slip value s equals −1 for a negative slip, 0 for no slip and +1 for a positive slip. For a FFT with a normal order output, $$\phi_k = \frac{2\pi}{N}k.$$

If the FFT has been FFT-shifted, however, as in the BWIF standard discussed herein before, $$\phi_k = \frac{2\pi}{N}k - \pi.$$

Using the compensated training tones from Equation (4) in Equation (1) yields $$\hat{P}[k_T] = e^{-j\left(\frac{2\pi}{N}k_T - \pi\right)s} \cdot Y[k_T, b_2] \cdot Y^*[k_T, b_1] \quad (5)$$

for $k_T \in \{\text{Training Tone Indices}\}$

As a result, there is a maximum phase angle error of $\pi$ radians in the complex conjugate multiply if the timing correction is not considered. It can be seen therefore, in view of the foregoing analysis, that for small values of v, this error could result in the incorrect demodulation of the CPS data.

In summary explanation of the preferred embodiment, a method is provided to achieve timing correction/compensation in CPS decode operations associated with OFDM-based, wireless communication systems. The method is straight forward, calling for determination of the phase angle difference between training tones in a burst without CPS data and training tones in a burst with CPS data, and then demodulating the phase angles to determine the CPS data.

In view of the foregoing discussion directed to an integer frequency algorithm, it can be seen that the pilot tones should add in phase for proper CPS demodulation. In case of slip, s, between two bursts, it can be shown that the phase corrected correlation can be written as $$\hat{P}[k_T] = e^{-j\frac{2\pi}{N}k_T s} Y[k_T, b_2] \cdot Y^*[k_T, b_1] = e^{-j\frac{2\pi}{N}k_T s} P[k_T] \quad (6)$$

when the frequency response data (i.e. FFT data) is in normal order. In the case where the frequency response data has been FFT-shifted, $\pi$ radians must subtracted to the phasor angle, as in Equation (5). Without loss of generality, it will be assumed that the frequency response data is in normal order in the remainder of this discussion.

By reviewing Equation (6), one can deduce that slip interferes with finding the correct starting point of the AAB/OCC* sequence required for CPS demodulation.

However, the slip effects can be nullified simply by multiplying $P[k_T]$ by $$e^{-j\frac{2\pi}{N}k_T s}$$

to provide the correct integer frequency estimate. In real time slip compensation however, there is usually a time delay between the time when the timing adjustment is made to the data stream and the time when the slip compensation algorithm detects the adjustment. As a result, the slip compensation algorithm will continue to correct for a slip even though the necessary corrective action has already taken place. As a result, false (and unnecessary) slips take place in the data path of the communication system. These false slips cause the slip value to oscillate between the values of −1 and +1 when monitored on a burst by burst bases.

Since, as discussed above, slip correction in the signal processing algorithms involves a complex multiplication by $$e^{-j\frac{2\pi}{N}k_T s},$$

where $k_T \in \{\text{Training Tone Indices}\}$, the multiplication will introduce undesirable and unnecessary noise into the calculations. For example, k=0 corresponds to the dirty "one" because "one" is not represented exactly with Q15 notation. In view of the foregoing, the embodiments of the present invention discussed herein above most preferably also include a technique for averaging the slip values to minimize the occurrence, and detection, of false slips being propagated through the signal processing algorithms of an OFDM-based, wireless communication system. A preferred technique for averaging the slip values is now described in further detail herein below.

While similar algorithms exist for identifying and correcting slips during data demodulation, the instant invention provides a method in which slip correction occurs during the CPS decode operation to ensure that the transmission parameters are properly decoded. Slip identification is usually detected by computing the correlation between two consecutive data bursts and identifying where the minimum value occurs as discussed herein above. The index value for the minimum value is compared to some desired index value for the minimum and the difference denotes the necessary timing adjustment required to properly align the data stream. The slip value s for data burst b can therefore be computed as $$s[b] = \begin{cases} +1 & \text{MinIndex} > \text{DesiredIndex} \\ 0 & \text{MinIndex} = \text{DesiredIndex} \\ -1 & \text{MinIndex} < \text{DesiredIndex} \end{cases}$$

where MinIndex is the index value of the minimum correlation value between two consecutive data bursts and DesiredIndex is the desired index value for the correlation value between the two consecutive data bursts.

After the slip correction is made to the data stream, there is a time delay before the slip identification algorithm detects the adjustment. This time delay will tend to cause the slip value to oscillate between the values of −1 and +1. A slip averager, as shown in block 304, is introduced into the computations to correct this problem in accordance with particular preferred embodiments of the present invention discussed below.

$$s[b] = \begin{cases} +1 & (\text{MinIndex} > \text{DesiredIndex} + \text{SlipTotal}[b-1]) \\ 0 & (\text{MinIndex} = \text{DesiredIndex} + \text{SlipTotal}[b-1]) \\ -1 & (\text{MinIndex} < \text{DesiredIndex} + \text{SlipTotal}[b-1]) \end{cases}$$

$$\text{where } \text{SlipTotal}[b] = \sum_{k=0}^{\text{SlipDelay}-1} s[b-k].$$

The SlipDelay variable refers to the timing delay between the time when the timing adjustment is made to the data stream and the time when the slip identification algorithm detects the adjustment. By computing the slip value in this manner, unnecessary timing adjustments can be avoided and the SNR of the signal processing algorithms can be maintained in the wireless communication system In view of the above, it can be seen the present invention presents a significant advancement in the art of OFDM-based, wireless communication systems. Further, this invention has been described in considerable detail in order to provide those skilled in the art of wireless communication systems with the information needed to apply the novel principles and to construct and use such specialized components as are required. In view of the foregoing descriptions, it should be apparent that the present invention represents a significant departure from the prior art in construction and operation. However, while particular embodiments of the present invention have been described herein in detail, it is to be understood that various alterations, modifications and substitutions can be made therein without departing in any way from the spirit and scope of the present invention, as defined in the claims which follow.

What is claimed is:

1. A method for achieving timing compensation in coding parameter signaling (CPS) decode operations in a transceiver device, the method comprising the steps of:
   receiving a first set of training tones in a first data burst;
   receiving a second set of training tones in a second data burst, the second data burst different from the first data burst;
   performing a complex conjugate multiply operation between the one of the first set of training tones and one of the second set of training tones until the complex conjugate multiply operation has been performed for all of the training tones;
   determining a phase angle for the result of each of the complex conjugate multiply operations;
   generating a binary pair for each complex conjugate multiply operation;
   combining all binary pairs to form decoded CPS data; and
   compensating for timing errors in the transceiver device using the decoded CPS data and the phase angles.

2. The method of claim 1 wherein one of the first set of data and the second set of data is a data burst without CPS data and the other is a data; burst with CPS data.

3. The method according to claim 1 wherein the step of performing a complex conjugate multiply operation comprises performing a complex conjugate multiply operation for all of the training tones according to the relationship $P[k_T]=Y[k_T, b_2] \cdot Y_T^*[k_T, b_1]$ for $k_T \in \{\text{Training Tone Indices}\}$, wherein $Y[k_T, b_2]$ denotes the frequency response of training tone $k_T$ in data burst $b_2$ and $Y_T^*[k_T, b_1]$ denotes complex conjugate of the frequency response of training tone $k_T$ in data burst $b_1$.

4. The method according to claim 1 wherein the step of performing a complex conjugate multiply operation comprises performing a complex conjugate multiply operation for all of the training tones according to the relationship $P[k_T]=e^{-j\phi_{kT}} \cdot Y[k_T, b_2] \cdot Y_T^*[k_T, b_1]$ for $k_T \in \{\text{Training Tone Indices}\}$ whenever a positive slip is detected in data burst $b_2$ with respect to the data burst $b_1$, wherein $Y[k_T, b_2]$ denotes the frequency response of training tone $k_T$ in data burst $b_2$, $Y_T^*[k_T, b_1]$ denotes complex conjugate of the frequency response of training tone $k_T$ in data burst $b_1$ and $\phi_{k_T}$ is a sequence of known phase rotations.

5. The method according to claim 1 wherein the step of performing a complex conjugate multiply operation comprises performing a complex conjugate multiply operation for all of the training tones according to the relationship $P[k_T]=e^{j\phi_{kT}} \cdot Y[k_T, b_2] \cdot Y_T^*[k_T, b_1]$ for $k_T \in \{\text{Training Tone Indices}\}$ whenever a negative slip is detected in data burst $b_2$ with respect to the data burst $b_1$, wherein $Y[k_T, b_2]$ denotes the frequency response of training tone $k_T$ in data burst $b_2$, $Y_T^*[k_T, b_1]$ denotes complex conjugate of the frequency response of training tone $k_T$ in data burst $b_1$ and $\phi_{k_T}$ is a sequence of known phase rotations.

6. The method according to claim 1 wherein the step of performing a complex conjugate multiply operation comprises performing a complex conjugate multiply operation for all of the training tones according to the relationship $P[k_T]=e^{-j\phi_{kT}s} \cdot Y[k_T, b_2] \cdot Y^*[k_T, b_1]$ for $k_T \in \{\text{Training Tone Indices}\}$ whenever a slip is detected in data burst $b_2$ with respect to the data burst $b_1$, wherein $Y[k_T, b_2]$ denotes the frequency response of training tone $k_T$ in data burst $b_2$, $Y_T^*[k_T, b_1]$ denotes complex conjugate of the frequency response of training tone $k_T$ in data burst $b_1$, $\phi_{k_T}$ is a sequence of known phase rotations and s is the slip value.

7. The method according to claim 6 wherein the slip value s equals −1 when data burst $b_2$ experiences a negative slip with respect to data burst $b_1$, and wherein the slip value s equals +1 when a positive slip is detected in data burst $b_2$ with respect to data burst $b_1$, and further wherein the slip value s equals 0 when no slip is detected in data burst $b_2$ with respect to data burst $b_1$.

8. The method according to claim 6 wherein the slip value s for data burst b, which can be written as s[b], is determined according to the relationship $$s[b] = \begin{cases} +1 & (MinIndex > DesiredIndex + SlipTotal[b-1]) \\ 0 & (MinIndex = DesiredIndex + SlipTotal[b-1]) \\ -1 & (MinIndex < DesiredIndex + SlipTotal[b-1]) \end{cases}$$

where $$SlipTotal[b] = \sum_{k=0}^{SlipDelay-1} s[b-k],$$

and wherein SlipDelay is a timing delay between the time when a timing adjustment is made to a data stream containing the data bursts and the time when a corresponding slip identification algorithm detects the adjustment, and further wherein MinIndex is the index value of the minimum correlation value between two consecutive data bursts and DesiredIndex is the desired index value for the correlation value between the two consecutive data bursts.

9. The method according to claim 1 wherein the CPS data is associated with an OFDM-based wireless communication system.

10. An OFDM receiver adaped to perform the steps of claim 1.

* * * * *